(12) United States Patent
Gasthyus et al.

(10) Patent No.: US 10,870,158 B2
(45) Date of Patent: Dec. 22, 2020

(54) MILLING TOOL

(71) Applicant: SANDVIK INTELLECTUAL PROPERTY AB, Sandviken (SE)

(72) Inventors: Jacques Gasthyus, Saint Jean de Braye (FR); Damien Joly, Saint Avertin (FR); Philippe Andre, Amboise (FR); Vincent Lemoine, Notre Dame d'Oe (FR)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 0 days.

(21) Appl. No.: 16/347,001

(22) PCT Filed: Oct. 4, 2017

(86) PCT No.: PCT/EP2017/075172
§ 371 (c)(1),
(2) Date: May 2, 2019

(87) PCT Pub. No.: WO2018/086802
PCT Pub. Date: May 17, 2018

(65) Prior Publication Data
US 2019/0262912 A1    Aug. 29, 2019

(30) Foreign Application Priority Data

Nov. 9, 2016    (EP) .................................... 16198001

(51) Int. Cl.
*B23C 5/06*    (2006.01)
*B23C 5/18*    (2006.01)

(52) U.S. Cl.
CPC .................. *B23C 5/06* (2013.01); *B23C 5/18* (2013.01); *B23C 2200/208* (2013.01);
(Continued)

(58) Field of Classification Search
CPC .... B23C 5/06; B23C 5/18; B23C 5/10; B23C 5/109; B23C 2210/287; B23C 2210/285; B23C 2220/605; B23C 2200/208
See application file for complete search history.

(56) References Cited

U.S. PATENT DOCUMENTS 5,486,075 A * 1/1996 Nakamura .............. B23B 51/02
                                                    408/224
6,913,424 B2    7/2005 Kuroda et al.
(Continued)

FOREIGN PATENT DOCUMENTS

CA    2209420 A1    5/1997
EP    0366111 a2    5/1990
(Continued)

*Primary Examiner* — Ryan C Rufo
(74) *Attorney, Agent, or Firm* — Corinne R. Gorski (57) ABSTRACT

A milling tool for face milling includes a tool body and a plurality of cutting members arranged successively along a periphery of the tool body. Each cutting member includes a main cutting edge provided for a roughing operation and a subset having a first, a second and a third secondary cutting edge provided for a finishing operation. The first and third secondary cutting edges extend in a direction perpendicular to an axial direction and the second secondary cutting edge extends between the first and third secondary cutting edge. The main cutting edges are situated at the same radial position and the first secondary cutting edges are situated at the same axial position. A first end point of the second secondary cutting edges successively progress radially inward and a second end point of the second secondary cutting edges successively progress radially inward and axially outward along the periphery of the tool body.

15 Claims, 4 Drawing Sheets

(52) U.S. Cl.
CPC .. *B23C 2210/285* (2013.01); *B23C 2210/287* (2013.01); *B23C 2220/605* (2013.01); *B23C 2226/315* (2013.01)

(56) References Cited

U.S. PATENT DOCUMENTS

| | | | |
|---|---|---|---|
| 2002/0172567 A1* | 11/2002 | Popke | B23C 5/20 |
| | | | 407/35 |
| 2003/0129033 A1* | 7/2003 | Koskinen | B23C 5/06 |
| | | | 409/132 |
| 2007/0269278 A1 | 11/2007 | Scherbarth | |
| 2010/0215446 A1 | 8/2010 | Wandebaeck | |
| 2012/0039675 A1* | 2/2012 | Men | B23C 5/109 |
| | | | 407/40 |
| 2014/0161544 A1* | 6/2014 | Morandeau, Sr. | B23C 3/13 |
| | | | 407/40 |
| 2017/0216940 A1* | 8/2017 | Aso | B23C 5/109 |

FOREIGN PATENT DOCUMENTS

| | | | | |
|---|---|---|---|---|
| JP | 3754915 B2 * | 3/2006 | | B23C 5/109 |
| WO | WO-2010035870 A1 * | 4/2010 | | B23C 5/06 |

\* cited by examiner

MILLING TOOL

RELATED APPLICATION DATA

This application is a § 371 National Stage Application of PCT International Application No. PCT/EP2017/075172 filed Oct. 4, 2017 claiming priority to EP 16198001.6 filed Nov. 9, 2016.

FIELD OF THE INVENTION

The present invention generally relates to the field of milling tools. In particular, the present invention relates to a milling tool for face milling comprising a plurality of cutting members arranged along a periphery of the tool body.

TECHNICAL BACKGROUND

In the field of face and shoulder milling, it is commonly known to provide the rotating milling tools with cutting members in the form of cutting inserts or integrated cutting edges (solid milling tools) arranged along the periphery of the milling tool body. Furthermore, requirements to be achieved by such face and shoulder milling operations commonly include both efficient machining, i.e. an efficient removal of a certain amount of material in order to achieve a desired depth of cut, as well as the achieving of a desired surface finish on the machined surface. Achieving a high surface finish, particularly in face milling, is crucial in certain industries, such as the automotive industry (in face milling engine blocks or cylinder heads).

In order to achieve at least the first of these requirements, face milling tools primarily adapted to provide fast, efficient machining are known. Accordingly, such face milling tools are primarily adapted to remove larger amounts of material efficiently, i.e. to achieve the desired depth of cut as efficiently as possible, but instead tend to leave a rough surface comprising burrs and the like. The operation provided by such face milling tools is therefore often referred to as a roughing operation.

Conventionally, in order to be able to achieve the requirement of a desired high surface finish as well, it is therefore common to use a multi-stage machining approach wherein the initial roughing operation is followed by a second operation performed by another face milling tool adapted to finish the machined surface of the part, often referred to as a finishing operation.

Face milling tools adapted to perform such a finishing operation commonly have a much lesser depth of cut than the preceding roughing operation and are instead adapted to leave a smooth, burr-free machined surface. One example of such a face milling tool for a finishing operation is the face milling tool marketed under the name Sandvik Coromant M5B90 by the applicant of the present invention.

However, the use of such multi-stage machining approach adds considerably to the complexity of the milling operation and also to manufacturing time required to perform the multi-stage milling operation.

In order to alleviate some of these drawbacks, solutions have been proposed to introduce a combined tool providing a simultaneous roughing- and finishing operation. For example, U.S. Pat. No. 6,913,424 discloses a milling cutter for machining a smooth finished surface and preventing burrs. The disclosed milling cutter is provided with two different inserts, wherein a single insert is projecting in the axial direction with a single wiper edge for preventing burrs, whereas the other inserts comprise main edges performing the major cutting work. Another example is provided by EP0366111 disclosing a similar milling cutter as U.S. Pat. No. 6,913,424 for achieving a smooth surface finish and preventing burrs. The tool of EP0366111 is being provided with two different inserts; a burr cutting insert and standard cutter inserts respectively.

However, the quality of the surface finish provided by such known combined tools is still lower compared to the finish provided by dedicated finishing operation tools, such as the M5B90 by Sandvik Coromant.

SUMMARY OF THE INVENTION

Accordingly, it is an object of the present invention to provide an improved face milling tool for roughing and finishing of the work piece in just one operation, thus providing an improved surface finish by leaving as little burrs, scratches or flaking of the finished surface as possible. In particular, it is an object to provide such an improved face milling tool adapted to reduce the machining time required as compared to the prior art.

According to one aspect of the invention, a milling tool for face milling of a work piece is provided. The milling tool comprising a tool body, having a central rotation axis defining an axial direction with an envelope surface extending along an axial extension A and a front surface extending along a radial extension R, and a plurality of cutting members arranged successively along a periphery of the tool body for radial and axial machining of the work piece. Each of the cutting members comprising a rake face, a clearance surface and a main cutting edge for roughing operation, wherein the main cutting edge is formed between the rake face and the clearance surface and extends along the axial direction at the periphery of the envelope surface of the tool body, and wherein at least a subset of said cutting members, said subset comprising at least two cutting members, comprises a plurality of secondary cutting edges for finishing operation, wherein the plurality of secondary cutting edges are formed between the rake face and the clearance surface at the periphery of the front surface of the tool body. The plurality of secondary cutting edges comprises at least a first secondary cutting edge, a second secondary cutting edge, and a third secondary cutting edge. Wherein the first and third secondary cutting edges extend in a direction perpendicular to the axial direction A and the second secondary cutting edge extends between the first and the third secondary cutting edge (i.e. between the respective end point of the first and third secondary cutting edge), wherein the main cutting edges of the cutting members are situated at the same radial position along the periphery of the envelope surface of the tool body, the first secondary cutting edges being situated at the same axial position, wherein said first secondary cutting edge is connected to said main cutting edge via a corner cutting edge, such that the axial position on said corner cutting edge determines the relative amount of material being machined by the main cutting edge and the secondary cutting edges respectively of a total depth of cut of the milling tool, and wherein a first end point of the second secondary cutting edges successively progress radially inward, and a second end point of the second secondary cutting edge successively progress radially inward and axially outward along the periphery of the front surface of the tool body, such that a second secondary cutting edge of a succeeding cutting insert has a greater length and is situated closer to the central rotation axis of the tool body than a second secondary cutting edge of a preceding cutting member along the periphery of the front surface of the tool body.

According to the first aspect, the milling tool provides a solution to the objects described above derived from the realization that the desired characteristics can be achieved by a design of cutting members providing a possibility of combining a main cutting edge and a number of secondary cutting edges on the same cutting member. The main cutting edge is positioned at the same diameter for all cutting members and terminates at the same axial position for all cutting members, whereas the secondary cutting edges for finishing operation differ between the at least two cutting members comprised by the subset by means of a predetermined progression in radial and axial direction by at least some of the secondary cutting edges. Hence, the cutting members have a different shape with regard to the secondary cutting edges. The progression of the secondary cutting edges may be adapted to the specific application in question and further depends on the depth of cut, the feed rate and the cutting speed used in the milling operation at hand. The term progression should be understood as a stepwise shift of a secondary cutting edge and/or a point on a secondary cutting edge between succeeding cutting members, for example such that a point on a secondary cutting edge of a succeeding cutting insert is positioned axially further from the front surface of the tool body and/or radially closer to an axis of rotation of the milling tool than the corresponding point and/or secondary cutting edge of a preceding cutting member along the periphery of the front surface of the tool body.

Accordingly, the main cutting edges are located on the same diameter for performing the roughing operation directly without any previous roughing, wherein the secondary cutting edges progressively extend in a stepwise manner in the radial and axial direction for the finishing operation in order to provide a smooth finished surface. The burr left by the cutting edge is therefore gradually suppressed by the progression of the secondary cutting edges. Hereby, an improved surface finish is achieved as compared to the prior art. Further, the design with the progression of the stepped secondary cutting edges allows very high feed milling for example in that a large number of cutting members may be provided, thus, apart from providing a reduction of time due to the use of one combined tool for the complete roughing- and finishing operation, also providing an advantageous further reduction of time required for the single milling operation itself.

In one embodiment, the number of cutting members comprised by the subset equals the total number of cutting members arranged along the periphery of the tool body. The number of cutting members comprised by the subset, i.e. the number of cutting members actually comprising the secondary cutting edges as described in the foregoing, may however be any number between 2 and the total number of cutting members.

In some embodiments, the main cutting edge extends along the axial direction at the periphery of the envelope surface of the tool body when the cutting member is arranged on the tool body, such that an entering angle of the main cutting edge is 90°. Such an embodiment may be advantageous in that the tool may come close to the part to be machined and further in that the strength and durability of the cutting member may be managed in an efficient manner. However, in the face milling tool of the present invention, the main cutting edge extending along the axial direction should be interpreted to also include extensions in the radial direction on the main cutting edge at the periphery of the envelope surface of the tool body when the cutting member is arranged on the tool body, such that an entering angle of the main cutting edge is <90°.

The disclosed milling tool is further suitable for any type of face milling and some embodiments of the milling tool may be especially suitable for performing shoulder milling. Further, some embodiments may be adapted for face- and/or shoulder milling of aluminium work pieces, and in particular face and shoulder milling of aluminium parts within the automotive- and aero industry.

The milling tool may be adapted to provide, i.e. to be used in, any rotational direction. In other words, the milling tool may be a right hand cutter or a left hand cutter.

The milling tool may in some embodiment comprise suitable fastening means for attaching the milling to a spindle providing a rotational movement to the tool, such means may be arranged for example on the opposite end of the milling tool as compared to the end on which the cutting members are arranged. Examples of such means include means for providing a form fitting between the tool and a corresponding structure of the spindle, i.e. means adapted to mate, or cooperate, with corresponding fastening means arranged on the spindle.

The tool body of the face milling tool may preferably be provided with fixedly/semi-permanently attached cutting members in the form of cutting inserts being brazed in the seats of the tool body. The tool body may alternatively be provided with replaceable inserts if sufficient care is taken in view of securing both manufacturing tolerances and mounting of the replaceable inserts in the correct order. In some embodiments, especially face milling tools having a smaller diameter, the face milling tool may with advantage be formed as a solid cemented carbide tool with the tool body and cutting members formed in one piece.

According to one embodiment, the first secondary cutting edge is connected to said main cutting edge via a corner chamfer cutting edge, i.e. a corner cutting edge extending and forming a chamfer between said main cutting edge and said first secondary cutting edge. A corner chamfer cutting edge is advantageous for example in that the load on the tool is limited. Further, a chamfer edge may provide better chip control as compared to a radius since chips may be made shorter.

This is advantageous in that the size of the finishing stepped area, i.e. the amount of remaining material to be removed by the secondary stepped cutting edges is managed by the axial position of this corner formed between the main cutting edge and the first secondary cutting edge. In other words, the axial position on the corner between the main edge and the first secondary edge will determine the relative amount of material being machined by the secondary cutting edges for finishing operation and the main cutting edge for roughing respectively, of a maximum depth of cut. Hence, designing the milling tool with the corner more axially rearward on the milling tool will give more material for the finishing edges and less material for the roughing edges. The more material left for the secondary cutting edges, the more cuts are needed and vibrations, a phenomenon also known as "hammering" can be significantly reduced by having more secondary cutting edges in engagement simultaneously.

The advantageous functionality of the cutting member described above is accordingly due to the inventive design allowing for a combined roughing and finishing operation, which allows for a "transfer" or redistribution of remaining material to remove from the main cutting edge (i.e. the rouging operation) to the secondary cutting edges (i.e. the finishing operation) by means of a repositioning of this corner.

In some embodiments, the first secondary cutting edge may be connected to the main cutting edge via a radiused corner cutting edge, i.e. a rounded corner edge. The skilled person further realizes that any other type of design of the connection between the first secondary cutting edge and the main cutting edge is conceivable within the scope of the present application.

In any case, the portion of the total depth of cut provided by means of the main- and secondary cutting edges is determined by the axial position of this corner edge, or in other words the length of the main cutting edge.

With regards to the global orientation of the cutting member, in some embodiments, the cutting members may be arranged at an angle with respect to a radial direction defined between the main cutting edge and the axis of rotation of the milling tool. For example, such that the third secondary cutting edge forms (i.e. extends at) an angle with respect to a radial direction defined for example from the outer end point of the third secondary cutting edge to the centre of the milling tool. In some embodiments, such an angle may belong to the range −10° to +10° with respect to the radial direction. Advantageous provided includes a smoother cutting operation.

Further, in some embodiments, the cutting members are arranged such that the main cutting edge extends in a plane parallel to the axial direction but at an angle with respect to the axial direction. In some embodiments, such an axial rake angle γ may belong to the range −10° to +10°, yet preferably it is a positive axial rake angle to provide smooth cutting action.

According to one embodiment, the first end point of said second secondary cutting edge successively progress radially inward by a first radial distance r1 between subsequent cutting members and said second end point of said second secondary cutting edge successively progress radially inward by a second radial distance r2 between subsequent cutting members, so that each second secondary cutting edge is extending axially outwards and radially inwards by being inclined at an acute angle in relation to the central rotation axis, preferably so that the acute inclination angle is the same on all of the second secondary cutting edges. Such an angle is especially advantageous in that chip thickness may be reduced, thus getting a smoother cut effect. Embodiments having second secondary cutting edges extending axially only are however conceivable within the scope of the present application.

In some embodiments, at least one of said first radial distance r1 and said second radial distance r2 lies in the range 0.1-0.50, in some embodiments at least one of r1 and r2 lies in the range between 0.15-0.20 mm.

Further, in some embodiments, the value(s) of r1 and/or r2 may be fixed to a certain value, chosen depending on the application, between cutting members such that the possible feed per revolution depends on the number of teeth, i.e. the feed per revolution is defined by the feed per tooth multiplied by the number of cutting members.

In some embodiments, the second end point of the second secondary cutting edge successively progress axially outwards by an axial distance a2 between subsequent cutting members.

Similarly to what has been described above, in some embodiments, the value of the axial distance a2 may be fixed to a certain value (chosen depending on the application) for example such that the possible feed per revolution depends on the number of teeth, i.e. the feed per revolution is defined by the feed per tooth multiplied by the number of cutting members.

In some embodiments, the milling tool may comprise n cutting members, wherein the second end point of the second secondary cutting edge successively progress axially outwards by an axial distance a2 between subsequent cutting members 1-(n−1), wherein the second end point of the second secondary cutting edge successively progress axially outwards by another axial distance a3 between the subsequent cutting members (n−1) and n, and wherein a3≠a2.

Embodiments are conceivable, depending on for example the application, wherein the relationship between a2 and a3 may be described as any one of the following: a3>a2 or a3<a2. Especially with regards to an embodiment exhibiting a relationship a3<a2, such a last cutting member may be described as having a wiper effect, guaranteeing the desired surface quality. Further, such a design may be advantageous for example in that minimum chip thickness may be effectively controlled.

In some embodiments, the first radial distance r1 is equal to the second radial distance r2, whereas in other embodiment r1 may differ from r2. The acute angle is therefore determined by the relationship between r1 and r2, and the axial extension, or progression, of each second secondary cutting edge.

In some embodiments, at least one of the radially inward progression of the first end point of the second secondary cutting edge, the radially inward progression and the axially outward progression of the second end point of the secondary cutting edge is/are uniform between all cutting members along the periphery of the tool body. In other embodiments, at least one of the radially inward progression of the first end point of the second secondary cutting edge, the radially inward progression and the axially outward progression of the second end point of the secondary cutting edge may differ between different cutting members, e.g. between different adjacent pairs of cutting members, along the periphery of the tool body. For example, for a cutting tool comprising n cutting members, at least one of the following relationships may apply: $r1_n \neq r1_{(n+1)}$, $r2_n \neq r2_{(n+1)}$ and $a2_n \neq a2_{(n+1)}$.

According to one embodiment, the cutting depth of the main cutting edge lies in the range 0.1-4 mm, preferably at least 1-4 mm. According to one embodiment, the total cutting depth of the milling tool including the main and secondary cutting edges lies in the range 0.2-5 mm. Hence, the total cutting depth is defined as the cutting depth of the main cutting edge and the maximum axial extension of the secondary cutting edges. In other words, the axial extension of the secondary cutting edges comprises the last cutting member along the periphery, i.e. the total axial progression over all cutting members. As explained above, the axial position on the corner between the main edge and the first secondary edge will therefore determine the relative amount of material being machined by the secondary cutting edges for finishing operation and the main cutting edge for roughing respectively, i.e. the cutting depth of the main cutting edge in relation to the total cutting depth.

According to one embodiment, the cutting members are formed by cutting inserts being brazed onto the tool body, preferably having main and secondary cutting edges formed in PCD material. PCD material may be particularly advantageous for machining of aluminium parts. Other examples include secondary cutting edges formed in CBN material or cemented carbide.

One import advantage of such brazed cutting members is that handling of the milling tool is facilitated, for example since there is no possibility for a user of the milling tool to accidentally mount the members in the wrong order. Further, brazed cutting inserts may allow for a larger number of cutting members as compared to an insert design.

According to one embodiment, the diameter of the cutting tool range from a diameter of 12 mm to a diameter of 100 mm. In some embodiments, the diameter ranges from 25-75 mm A smaller diameter of the milling tool is especially advantageous with regards to machining of thin walls, for example due to the possibility of providing a larger number of cutting members in because a larger number of cutting members may engage the work piece simultaneously which as described above considerably reduces problems of so called hammering.

According to one embodiment, the angular distance between adjacent cutting members of the milling tool lies in the range 10-90°. In some embodiments, in the range 35-75°. Such an angular distance may be referred to as pitch and is determined by the number of cutting members and the diameter of the milling tool.

For example, in some embodiments, examples of suitable numbers of teeth for different exemplary diameters include a maximum number of 8 cutting members for a tool having a diameter of 25 mm and a maximum number of 26 cutting members for a tool having a diameter of 100 mm. Similarly to what has been described above, a close pitch between the cutting members also contributes to an advantageous arrangement wherein several cutting members are simultaneously in engagement, even when milling thin walls, to avoid hammering i.e. vibrations.

According to a second aspect of the invention, a kit of replaceable cutting inserts adapted to be arranged successively along a periphery of a tool body of a milling tool for face milling comprising a tool body, having a central rotation axis defining an axial direction with an envelope surface extending along the axial extension A and a front surface extending along a radial extension R, for radial and axial machining of a work piece, each of the cutting inserts comprising a rake face, a clearance surface and a main cutting edge for roughing operation, wherein the main cutting edge is formed between the rake face and the clearance surface and adapted to extend in the axial direction at the periphery of the envelope surface of the tool body, and a plurality of secondary cutting edges for finishing operation, wherein the plurality of secondary cutting edges are formed between the rake face and the clearance surface at the periphery of the front surface of the tool body, and wherein the plurality of secondary cutting edges comprises at least a first secondary cutting edge, a second secondary cutting edge, and a third secondary cutting edge. Wherein the first and third secondary cutting edges are adapted to extend in a direction perpendicular to the axial direction A and the second secondary cutting edge are adapted to extend between the first and the third secondary cutting edge, wherein the main cutting edges of the cutting inserts are adapted to be situated at the same radial position along the periphery of the envelope surface of the tool body, the first secondary cutting edges are adapted to be situated at the same axial position and wherein a first end point of the second secondary cutting edges is adapted to successively progress radially inward, and a second end point of the second secondary cutting edge is adapted to successively progress radially inward and axially outward along the periphery of the front surface of the tool body, such that a second secondary cutting edge of a succeeding cutting insert has a greater length and is situated closer to the central rotation axis of the tool body than a second secondary cutting edge of a preceding cutting inserts along the periphery of the front surface of the tool body, when arranged on the tool body.

For example, such a kit may be a full set of cutting inserts adapted to be brazed to the milling tool before a new machining phase.

Further objectives of, features of and advantages with the present invention will become apparent when studying the following detailed disclosure, the drawings and the appended claims. Those skilled in the art realize that different features of the present invention can be combined to create embodiments other than those described in the following.

BRIEF DESCRIPTION OF THE DRAWINGS

The invention will be better understood through the following illustrative and non-limiting detailed description of preferred embodiments, with reference to the appended drawings, on which.

All figures are schematic, not necessarily to scale, and generally only show parts which are necessary in order to elucidate the invention, wherein other parts may be omitted or merely suggested.

DETAILED DESCRIPTION OF EMBODIMENTS

Figures 1A, 1B, 1C:
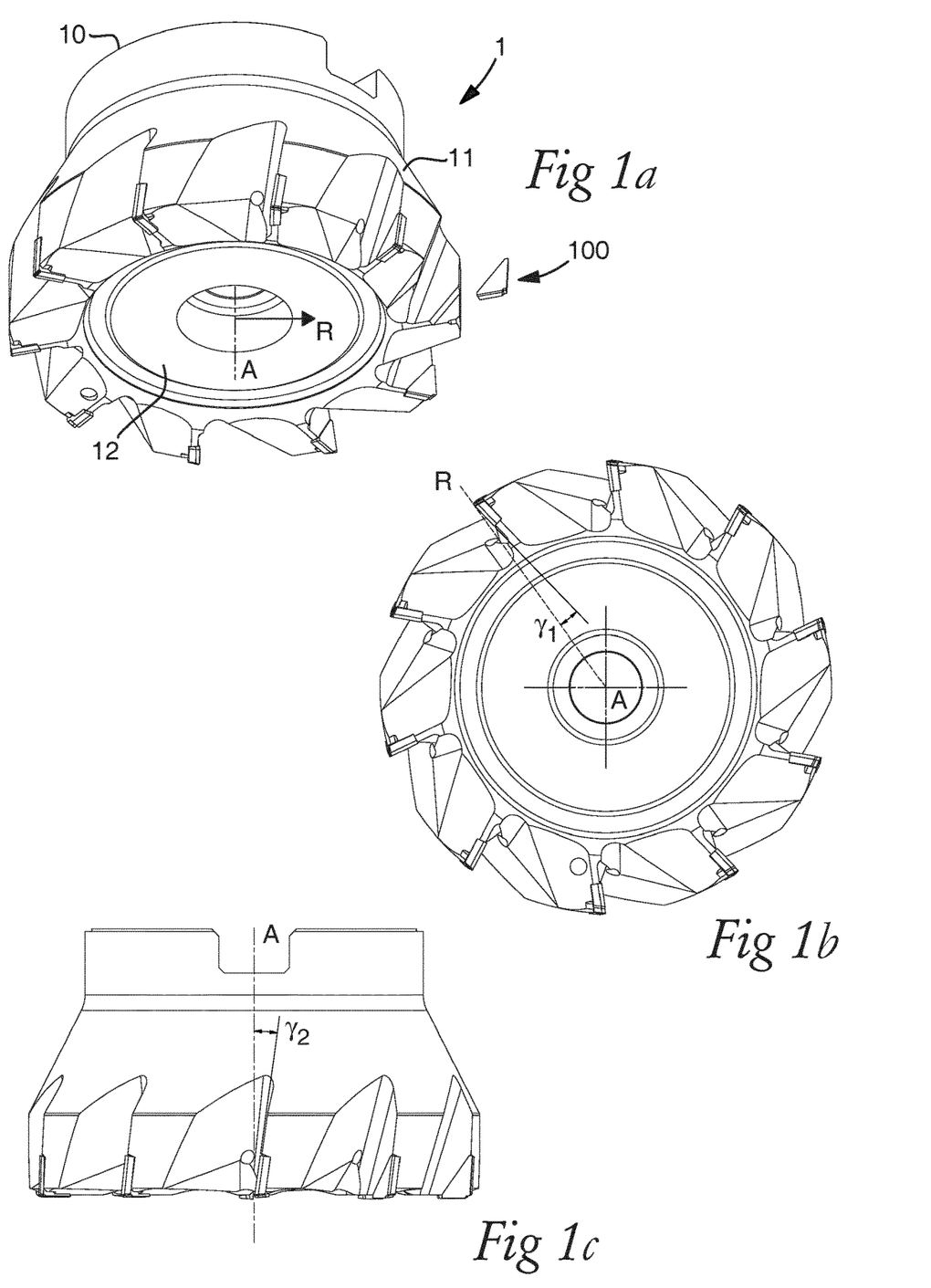
FIG. 1a is a perspective view of a milling tool according to one embodiment.
FIG. 1b is a bottom view of a milling tool according to one embodiment.
FIG. 1c is a side view of a milling tool according to one embodiment.

A milling tool according to one exemplary embodiment is shown in three different views in FIG. 1a-1c. The tool 1 comprises a tool body 10 having an envelope surface 11 extending along an axial extension A and a front surface 12 extending along a radial extension R. The illustrated exemplary embodiment of FIG. 1a-c is adapted for face milling and comprises 10 cutting members 100 arranged along the periphery of the tool body, the design of which will be descried in greater detail in the following. The cutting members are fixedly attached to the tool body, in the illustrated case by means of brazing.

As may be seen in FIG. 1b, the cutting members are arranged at a radial rake angle $\gamma$, i.e. such that for example the third secondary cutting edge extends at the radial rake angle $\gamma_1$ with respect to a radial direction defined for example from the first end point of the third secondary cutting edge to the centre of the milling tool. In general such a radial rake angle $\gamma_1$ may belong to the range $-10°$ to $+10°$. However, in the disclosed embodiment, the radial rake angle is positive in order to provide an easy/light cutting action on the main cutting edge. With respect to the axial direction, the cutting members are arranged such that the main cutting edge extends in a plane parallel to the axial direction but at an axial rake angle $\gamma_2$ with respect to the axial direction, in general such an axial rake angle $\gamma_2$ may belong to the range −10° to +10° (shown in FIG. 1c). The disclosed embodiment also discloses a positive angle on the axial rake angle in order to provide a positive inclination on the main cutting edge, which further contributes to the easy/light cutting action on the main cutting edge. The positive axial rake angle may also provide easy/light cutting action on the secondary cutting edges.

Figure 2A:
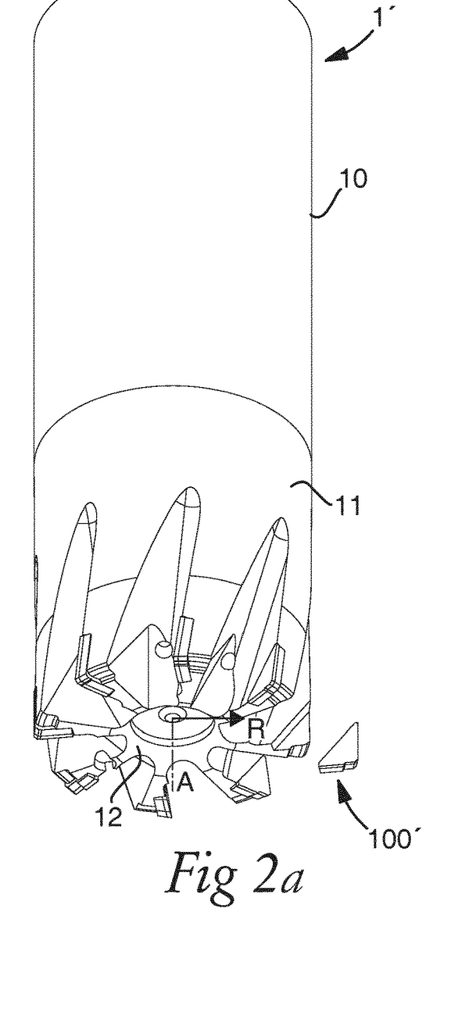
FIG. 2a is a perspective view of a milling tool according to one embodiment.
Figure 2B:
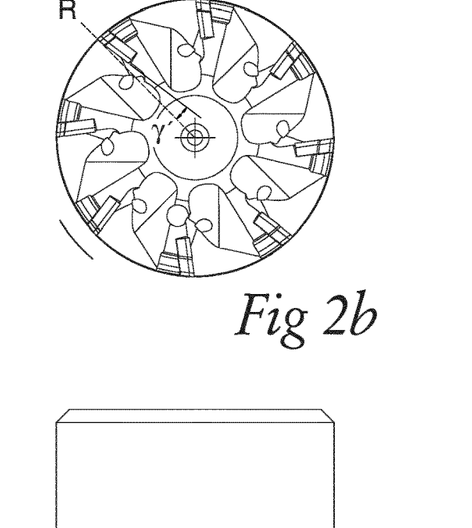
FIG. 2b is a bottom view of a milling tool according to another embodiment.
Figure 2C:
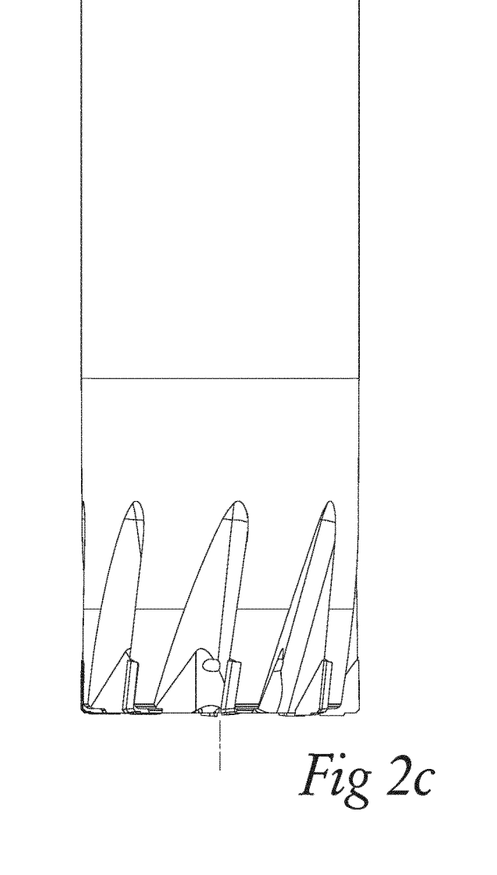
FIG. 2c is a side view of a milling tool according to another embodiment.

A second milling tool according to a second exemplary embodiment is shown in three different views in FIG. 2a-c. The tool 1' comprises a tool body 10' having an envelope surface 11' extending along an axial extension A and a front surface 12' extending along a radial extension R. The illustrated exemplary embodiment of FIG. 2a-c is adapted for shoulder milling and comprises 8 cutting members 100' arranged along the periphery of the tool body 10. The cutting members are fixedly attached to the tool body, in the illustrated case by means of brazing. Similarly to the embodiment illustrated in FIG. 1a-c, the cutting members are arranged at a radial rake angle $\gamma_1$, in general such an angle may belong to the range −10° to +10° (Illustrated in FIG. 2b). Also likewise, the cutting members are arranged such that the main cutting edge extends in a plane parallel to the axial direction but at an axial rake angle $\gamma_2$ with respect to the axial direction, in general such an axial rake angle $\gamma_2$ may belong to the range −10° to +10° (shown in FIG. 2c). Furthermore, as mentioned in the previous embodiment, both the radial and axial rake angles are positive in this embodiment to provide easy/light cutting action on the main cutting edge and the secondary cutting edges.

In the illustrated exemplary embodiments in FIGS. 1a-c and 2a-c, all cutting members arranged along the periphery of the cutting tool comprise the first, second and third secondary cutting edges.

Figure 3:
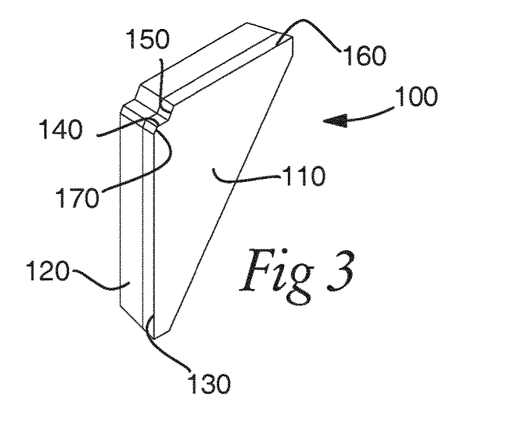
FIGS. 3-3h show a cutting member of the milling tool according to one embodiment in different views.
Figure 3A:
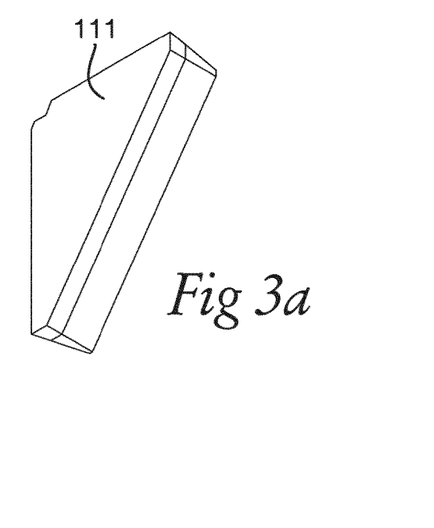
Figure 3B:
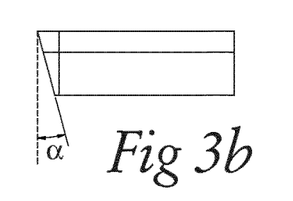
Figure 3C:
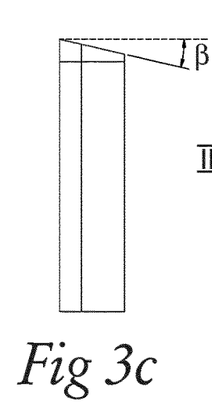
Figure 3D:
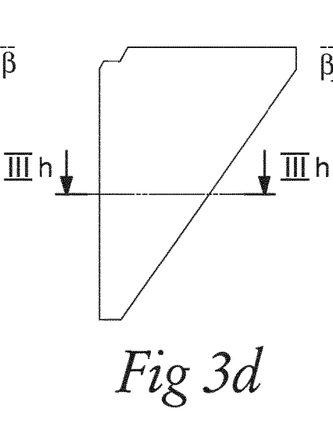
Figure 3E:
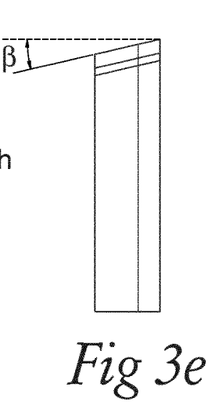
Figure 3F:
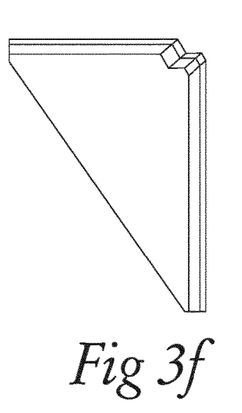
Figure 3G:
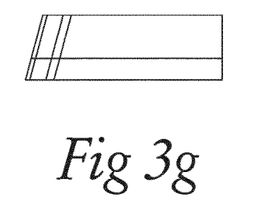
Figure 3H:
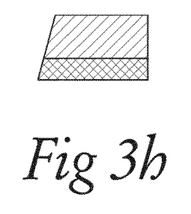

Turning to FIG. 3-3h, the design of an exemplary cutting member of the tool body will be described in detail.

FIG. 3 is a perspective view of a cutting member 100 according to one exemplary embodiment, the cutting member comprising a rake face 110, a clearance surface 120 and a main cutting edge 130 for roughing operation. The main cutting edge 130 is formed between the rake face 110 and the clearance surface 120 and is adapted to, when arranged on the tool body 10, extend in a direction parallel to the axis A which in the illustrated case coincides with the axis of rotation of the milling tool, such that the entering angle of the main cutting edge is 90°.

Three secondary cutting edges for finishing operation are formed between the rake face 110 and the clearance surface 120, a first secondary cutting edge 140, a second secondary cutting edge 150 and a third secondary cutting edge 160. The first and third secondary cutting edges 140, 160 are adapted to extend, when arranged on the tool body, in a direction perpendicular to the axis of rotation, i.e. in a radial direction, whereas the second secondary cutting edge 150 extends between the first- and third secondary cutting edge, i.e. between a respective end point 141, 162 of the first- and third secondary cutting edge respectively.

The main cutting edge 130 is connected to the first secondary cutting edge 140 via a corner cutting edge 170, in the illustrated case a corner chamfer edge 170.

The total cutting depth of the cutting member 100 is defined by the total height of the cutting member, i.e. the main cutting edge 130, the corner chamfer edge 170 and the secondary cutting edges 140, 150, 160. Accordingly, by means of a shift of the axial position of the corner chamfer cutting edge 170, the relative amount of material machined during the roughing operation and the finishing operation (provided by the secondary cutting edges 140, 150, 160) respectively may be determined.

FIG. 3a is a perspective view of the cutting member viewed from an opposite direction as compared to FIG. 3, i.e. showing a bottom side 111 opposite to the rake face adapted to, when arranged on the tool body, face a seat of the tool body. FIG. 3b is a side view of the cutting member, showing a clearance angle $\alpha$ of the main cutting edge, in general, the clearance angle $\alpha$ belongs to the range 0-20°. FIG. 3c shows a clearance angle $\beta$ of the third secondary cutting edge, in general the clearance angle $\beta$ belongs to the range 0-20°. FIG. 3e is a side view, opposite to FIG. 3c, (again showing the clearance angle $\beta$ of the third secondary cutting edge), whereas FIG. 3g is a side view of the cutting member, also showing the clearance angle $\alpha$ of the main cutting edge. FIG. 3h is showing a cross section of the cutting member comprising an upper part of PCD material on a lower part of cemented carbide material making the cutting member particularly suitable for face milling in aluminium.

Figure 4A:
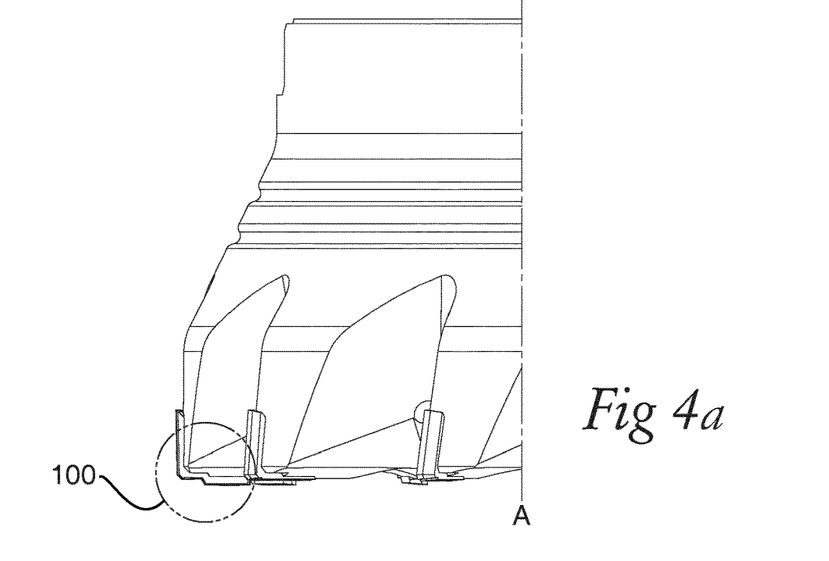
FIG. 4a is a detailed perspective view of the milling tool showing a number of cutting members arranged on the tool body.
Figure 4B:
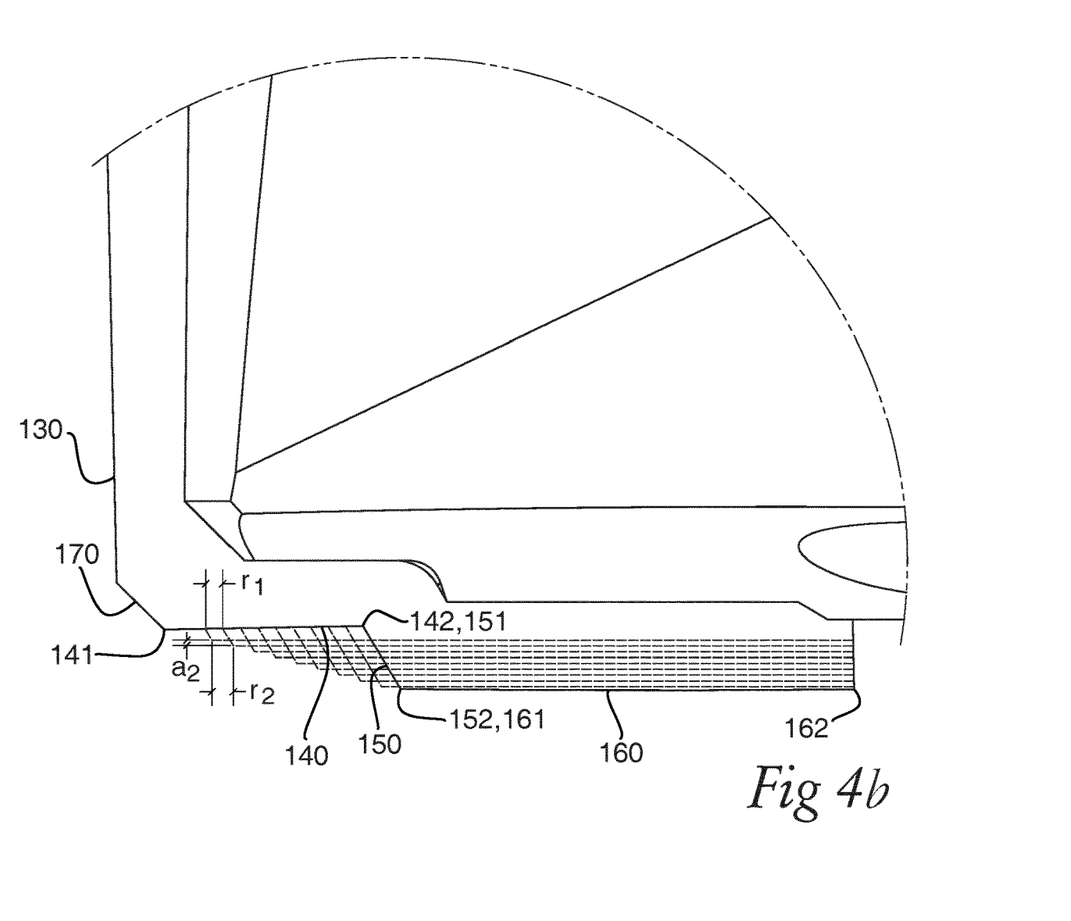
FIG. 4b is a schematic view indicating the progression of the secondary cutting edges of the cutting member along the periphery of the cutting tool.

FIGS. 4a and 4b are showing the progression of the secondary cutting edges of the cutting members 100 along the periphery of the front surface of the tool body, i.e. between succeeding cutting members for an exemplary embodiment, wherein FIG. 4a shows a first cutting member 100 arranged on a tool body 10, and FIG. 4b shows a superimposed view of all the secondary cutting edges along the periphery of the tool body (i.e. the progression).

As explained in the foregoing, the main cutting edge 130 of the cutting member 100, extending in a plane parallel to the axial direction A when arranged on the tool body as shown in FIG. 4a, is connected to the first secondary cutting edge 140 via the corner chamfer cutting edge 170. The first secondary cutting edge is adapted to extend, when arranged on the tool body as shown in FIG. 4a, in a direction perpendicular to the axial direction (i.e. in a plane perpendicular to the axis of rotation). The extension of the main cutting edge 130 and the corner chamfer edge respectively is the same, i.e., remain constant, over the cutting members along the periphery of the cutting tool.

The corner chamfer cutting edge 170 joins a first endpoint 141 of the first secondary cutting edge 140. The position of this first end point 141 of the first secondary cutting edge, as well as the axial position of the plane along which the first secondary cutting edge extends also remains constant over the cutting members along the periphery. Accordingly, the extension of the first secondary cutting edge is always perpendicular to the axial direction and the first secondary edge remains in the same plane perpendicular to the axial of rotation.

The second and third secondary cutting edges 150, 160 however change in terms of radial and/or axial extension, i.e. progress, along the periphery of the tool body.

The second secondary cutting edge 150, extending between the end points 151, 152, transforms between cutting inserts along the periphery of the tool such that the first end point 151 successively progress radially inward, and the second end point of the second secondary cutting edge successively progress radially inward and axially outwards. Consequently, as indicated in FIG. 4b, a second secondary cutting edge of a succeeding cutting insert has a greater length and is situated closer to the central rotation axis of said tool body than a second secondary cutting edge of a preceding cutting member along the periphery of said front surface of the tool body.

The third secondary cutting edges 160, extending in a plane perpendicular to the axial direction between endpoints 161 and 162, changes, i.e. progresses, along the periphery of the tool body according to the following: The first end point 161, coinciding with the second end point 152 of the second secondary cutting edge progresses, i.e., radially inwards and axially outwards for each cutting member along the periphery, whereas the outer end point 162 only moves axially outwards for each successive cutting member. Consequently, a third secondary cutting edge of a succeeding cutting insert has a shorter length and extends in a plane perpendicular to the axial direction, i.e. situated at an axial position further from the front surface along the central rotation axis of the tool body than a third secondary cutting edge of a preceding cutting member along the periphery of the front surface of the tool body. The third secondary cutting edge of each cutting member however always extends in a respective plane perpendicular to the axial of rotation.

While the invention has been illustrated and described in detail in the drawings and foregoing description, such illustration and description are to be considered illustrative or exemplary and not restrictive; the invention is not limited to the disclosed embodiments. The skilled person understands that many modifications, variations and alterations are conceivable within the scope as defined in the appended claims.

Additionally, variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope of the claims.

The invention claimed is:

1. A milling tool arranged for face milling of a work piece, said milling tool comprising:
   a tool body having a central rotation axis defining an axial direction, the tool body including a periphery, the periphery including an envelope surface extending along the axial direction and a front surface extending along a radial direction; and
   a plurality of cutting members arranged successively along the periphery of said tool body for radial and axial machining of said work piece, each of said plurality of cutting members including a rake face, a clearance surface, and a main cutting edge arranged for a roughing operation, wherein said main cutting edge is formed between said rake face and said clearance surface and extends along the axial direction and the envelope surface of the tool body, and wherein at least a subset of said cutting members, said subset having at least two cutting members, includes a plurality of secondary cutting edges arranged for a finishing operation, wherein said plurality of secondary cutting edges are formed between said rake face and said clearance surface along the front surface of the tool body, and wherein each of said plurality of secondary cutting edges includes at least a first secondary cutting edge, a second secondary cutting edge, and a third secondary cutting edge, wherein said first and third secondary cutting edges extend in a direction perpendicular to said axial direction and said second secondary cutting edge extends between said first and said third secondary cutting edges, the main cutting edges of the cutting members of said subset being situated at a same radial position along the envelope surface of the tool body, said first secondary cutting edges being situated at a same axial position, wherein said first secondary cutting edge is connected to said main cutting edge via a corner cutting edge, such that an axial position of said corner cutting edge determines a relative amount of material being machined by the main cutting edge and the plurality of secondary cutting edges respectively of a total depth of cut of the milling tool, and wherein a first end point of each of said second secondary cutting edges successively progresses radially inward relative to a succeeding cutting member of said subset, and a second end point of each of said second secondary cutting edges successively progresses radially inward and axially outward from the front surface along a periphery of said front surface of said tool body relative to the succeeding cutting member of said subset, such that the second secondary cutting edge of the succeeding cutting member has a greater length and is situated closer to the central rotation axis of said tool body than the second secondary cutting edge of a preceding cutting member along the periphery of said front surface of the tool body.

2. The milling tool according to claim 1, wherein the number of cutting members including said subset equals a total number of cutting members arranged along the periphery of said tool body.

3. The milling tool according to claim 1, wherein the corner cutting edge is a chamfer cutting edge.

4. The milling tool according to claim 1, wherein the cutting members are arranged such that the secondary cutting edges form a radial rake angle in a range of −10° to +10°, with respect to the radial direction defined between the main cutting edge and the axis of rotation of the milling tool, and wherein the main cutting edge extends in a plane parallel to the axial direction at an axial rake angle in a range of −10° to +10° with respect to the axial direction.

5. The milling tool according to claim 1, wherein said first end point of said second secondary cutting edges successively progress radially inward by a first radial distance between subsequent cutting members and said second end point of each said second secondary cutting edges successively progress radially inward by a second radial distance between subsequent cutting members, so that each second secondary cutting edge extends axially outwards and radially inwards by being inclined at an acute angle in relation to the central rotation axis, wherein the acute inclination angle is the same on all of the second secondary cutting edges.

6. The milling tool according to claim 5, wherein at least one of said first radial distance and said second radial distance is in the range 0.1-0.5 mm.

7. The milling tool according to claim 1, wherein said second end point of said second secondary cutting edges successively progress axially outwards by a fixed axial distance between subsequent cutting members.

8. The milling tool according to claim 1, wherein the second end point of the second secondary cutting edges successively progress axially outwards by an axial distance between subsequent cutting members, and wherein the second end point of the second secondary cutting edges successively progress axially outwards by another axial distance between the subsequent cutting members, and wherein said axial distances are non-equal.

9. The milling tool according to claim 1, wherein said main cutting edge extends in the axial direction at the periphery of the envelope surface of the tool body, such that an entering angle of the main cutting edge is 90°.

10. The milling tool according to claim 1, wherein a cutting depth of the main cutting edge is in the range 0.1-4 mm.

11. The milling tool according to claim 1, wherein the total cutting depth including the main cutting edge and the secondary cutting edges of the milling tool is in the range 0.2-5 mm.

12. The milling tool according to claim 1, wherein the plurality of cutting members are formed by cutting inserts being brazed onto the tool body the main and secondary cutting edges being formed of a PCD material.

13. The milling tool according to claim 1, wherein the diameter of the milling tool is from 12 to 100 mm.

14. The milling tool according to claim 1, wherein the angular distance between adjacent cutting member of the milling tool is in the range 10-90°.

15. A kit of replaceable cutting inserts configured to be arranged successively along a periphery of a tool body of a milling tool for face milling, said milling tool including a tool body having a central rotation axis defining an axial direction, said periphery including an envelope surface extending along the axial direction and a front surface extending along a radial direction, each of said cutting inserts including a rake face, a clearance surface, and a main cutting edge provided for a roughing operation, wherein said main cutting edge is formed between said rake face and said clearance surface and extends along the axial direction and the envelope surface of the tool body, when arranged on the tool body, and wherein the cutting inserts of a subset of the cutting inserts includes at least two cutting inserts including a plurality of secondary cutting edges provided for a finishing operation, wherein said plurality of secondary cutting edges are formed between said rake face and said clearance surface along the front surface of the tool body, and wherein each of said plurality of secondary cutting edges includes at least a first secondary cutting edge, a second secondary cutting edge, and a third secondary cutting edge, wherein said first and third secondary cutting edges, when arranged on the tool body, extend in a direction perpendicular to said axial direction and said second secondary cutting edges extend between said first and said third secondary cutting edge, wherein, when arranged on the tool body, the main cutting edges of the cutting inserts are situated at a same radial position along the envelope surface of the tool body, said first secondary cutting edges being situated at a same axial position and wherein, when arranged on the tool body, a first end point of each of said second secondary cutting edges successively progresses radially inward relative to a succeeding cutting insert of said subset, and a second end point of each of said second secondary cutting edges successively progresses radially inward and axially outward from the front surface along a periphery of said front surface of said tool body relative to the succeeding cutting insert of said subset, such that the second secondary cutting edge of the succeeding cutting insert has a greater length and is situated closer to the central rotation axis of said tool body than the second secondary cutting edge of a preceding cutting insert along said front surface of the tool body.

* * * * *